United States Patent
Chan et al.

(10) Patent No.: US 8,862,971 B1
(45) Date of Patent: Oct. 14, 2014

(54) INTER-TRACK INTERFERENCE (ITI) CORRELATION AND CANCELLATION FOR DISK DRIVE APPLICATIONS

(75) Inventors: Kai Keung Chan, Fremont, CA (US); Xin-Ning Song, San Jose, CA (US); Kwok W. Yeung, Milpitas, CA (US); Xianfeng Rui, Sunnyvale, CA (US)

(73) Assignee: SK hynix memory solutions inc., San Jose, CA (US)

( * ) Notice: Subject to any disclaimer, the term of this patent is extended or adjusted under 35 U.S.C. 154(b) by 391 days.

(21) Appl. No.: 13/166,717

(22) Filed: Jun. 22, 2011

Related U.S. Application Data

(60) Provisional application No. 61/448,149, filed on Mar. 1, 2011.

(51) Int. Cl.
*H03M 13/03* (2006.01)
*H04L 25/03* (2006.01)
*H04B 1/7085* (2011.01)

(52) U.S. Cl.
CPC .......... *H04L 25/0328* (2013.01); *H04B 1/7085* (2013.01)
USPC .......................................... 714/795

(58) Field of Classification Search
CPC ............ G11B 19/045; G11B 20/1217; G11B 20/10398; G11B 20/10296; G11B 2020/185; G11B 2020/1856; H03M 13/41; H03M 13/4138; H03M 13/2957; H03M 13/6343; H04L 25/0328; H04L 25/03286; H04L 1/0054; H04B 1/7085
USPC .......... 714/755, 801, 795, 770; 375/262, 341, 375/340, 348, 232; 360/45; 369/53.44
See application file for complete search history.

(56) References Cited

U.S. PATENT DOCUMENTS

| | | | | |
|---|---|---|---|---|
| 5,490,091 A | * | 2/1996 | Kogan et al. | 702/180 |
| 5,917,855 A | * | 6/1999 | Kim | 375/229 |
| 6,581,182 B1 | * | 6/2003 | Lee | 714/795 |
| 6,909,566 B1 | * | 6/2005 | Zaitsu et al. | 360/31 |
| 7,359,303 B2 | * | 4/2008 | Mohan et al. | 369/59.13 |
| 8,300,339 B1 | * | 10/2012 | Nangare et al. | 360/39 |
| 8,379,498 B2 | * | 2/2013 | Mathew et al. | 369/47.28 |
| 8,599,508 B1 | * | 12/2013 | Burd | 360/39 |
| 8,665,543 B2 | * | 3/2014 | Bellorado et al. | 360/45 |
| 2002/0124227 A1 | * | 9/2002 | Nguyen | 714/786 |
| 2004/0037202 A1 | * | 2/2004 | Brommer et al. | 369/94 |
| 2007/0165326 A1 | * | 7/2007 | Berman et al. | 360/77.12 |
| 2008/0151704 A1 | * | 6/2008 | Harada | 369/30.22 |
| 2008/0276156 A1 | | 11/2008 | Gunnam et al. | |
| 2008/0301521 A1 | | 12/2008 | Gunnam et al. | |
| 2012/0063284 A1 | * | 3/2012 | Mathew et al. | 369/53.44 |
| 2012/0105994 A1 | * | 5/2012 | Bellorado et al. | 360/45 |

* cited by examiner

*Primary Examiner* — Phung M Chung
(74) *Attorney, Agent, or Firm* — Van Pelt, Yi & James LLP

(57) ABSTRACT

Inter-track-interference correlation and cancellation for disk drive application includes receiving an input sequence of samples; and simultaneously processing the input sequence in at least a detector over one or more iterations while processing the input sequence to produce inter-track-interference information during at least a portion of one of the one or more iterations.

40 Claims, 13 Drawing Sheets

INTER-TRACK INTERFERENCE (ITI) CORRELATION AND CANCELLATION FOR DISK DRIVE APPLICATIONS

CROSS REFERENCE TO OTHER APPLICATIONS

This application claims priority to U.S. Provisional Patent Application No. 61/448,149 entitled CONTROLLER AND DATA PATH TO SUPPORT INTER-TRACK INTERFERENCE (ITI) CORRELATION AND CANCELLATION FOR DISK DRIVE APPLICATIONS filed Mar. 1, 2011 which is incorporated herein by reference for all purposes.

BACKGROUND OF THE INVENTION

Typically, the capacity of a hard disk drive depends on two parameters, Bit-Per-Inch (BPI) and Track-Per-Inch (TPI). BPI is a function of data rate. The higher the data rate, the higher the BPI. TPI is a function of how closely tracks are written. The closer the tracks are written, the higher the TPI. The product of BPI and TPI equals to the hard drive capacity.

When tracks are placed closer to each other and even overlapping, interference from adjacent tracks becomes significant (e.g., the interference affects the ability to recover the data written to the tracks). For example, the Signal-to-Noise Ratio (SNR) of the track being read can be reduced when the noise due to the adjacent tracks, or Inter-Track-Interference (ITI), is increased. The effects to the data sectors being read include higher Sector-Failure-Rate (SFR) and/or Sync Mark loss, for example.

It would be desirable to reduce the noise introduced by ITI when reading data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
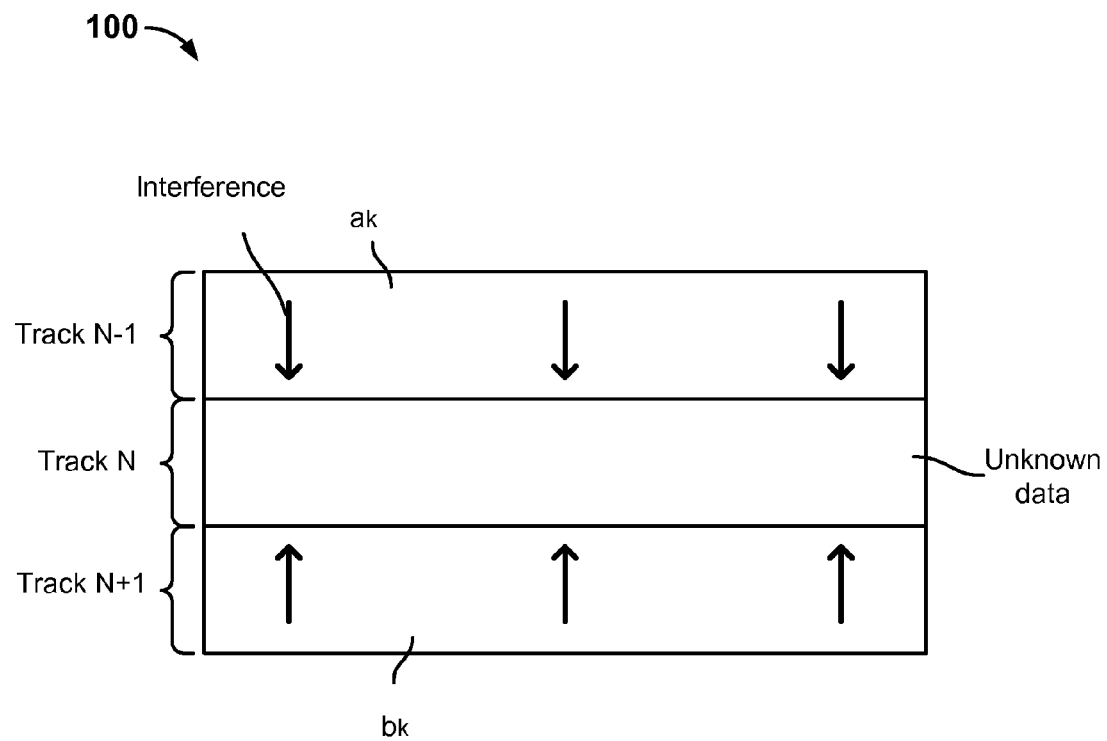
FIG. 1 is a diagram of an example of adjacent tracks.

FIG. 1 is a diagram of an example of adjacent tracks. In various embodiments, the tracks (Track N−1, Track N, and Track N+1) are tracks on a hard disk. For example, the three tracks can be associated with shingle magnetic recording (SMR), in which adjacent tracks partially overlap like shingles on a roof. One advantage to arranging tracks closely (or even in an overlapping fashion) is to increase track density on a platter. However, one disadvantage of layering tracks closely is a possible increase in inter-track-interference (ITI), which is the distortion to the signal of one track that is caused by the collective intersymbol interference (ISI) of symbols of another track (e.g., a track adjacent to the first track). ITI, which has a similar effect as noise, can cause the read signal of a track to be less reliable (e.g., more prone to error during data recovery and/or less likely to be decodable).

In the example, Track N has adjacent tracks Track N−1 and Track N+1. The data to be read from Track N is affected by the inter-track-interference from Track N−1 and Track N+1. In the example, Track N is to be read and so the data associated with Track N is still unknown data (e.g., until the data from Track N is processed and determined to be decodable). However, it is assumed that either or both adjacent tracks, Track N−1 and Track N+1, have already been read and successfully decoded (e.g., the data associated with Track N−1 and Track N+1 are now known). The successfully decoded data (e.g., output bit stream) associated with Track N−1 is ak and the successfully decoded data associated with Track N+1 is bk.

To improve the Sector-Failure-Rate (SFR) associated with the reading of Track N, the ITI of either or both of adjacent tracks Track N−1 and Track N+1 can be cancelled from the read data associated with Track N. In various embodiments, the procedure to remove ITI from the received signal associated with a track to be read includes two parts. The first part, which is herein referred to as ITI correlation, is to correlate (e.g., cross correlate) the received signal with known data associated with one or both adjacent tracks to produce one or more correlation coefficients. The second part, which is herein referred to as ITI cancellation is to cancel the ITI information from one or both adjacent tracks using the correlation results from the first part.

As disclosed herein, the ITI removal procedure can apply to an offline data recovery operation (e.g., the ITI removal procedure is performed subsequent to the detecting and decoding processes of certain data sectors) and/or to an on-the-fly detecting and decoding operation (e.g., the ITI removal procedure is performed in parallel to at least one iteration of processing a received signal). In some embodiments, an on-the-fly operation refers to performing at least the ITI correlation part of an ITI removal procedure in parallel to detecting and decoding data to result in minimal degradation of data detecting/decoding throughput. In some embodiments, an offline data recovery operation refers to data detecting/decoding with more relaxed throughput requirements (e.g., relative to the throughput requirements of an on-the-fly operation).

For example, assume that it is desired to read 100 sectors in a track of a hard disk. In the example, if an on-the-fly operation is performed, the 100 sectors can be read (e.g., data detected and decoded) as ITI removal is performed in parallel to the reading with minimal, if any, throughput degradation. Also, in the example, assume that 2 out of the 100 sectors cannot be decoded (e.g., the decoder generates an "uncorrectable" status). In response to the occurrence of these two undecodable sectors, the hard drive controller prepares to re-read at least these two sectors and the disk will take one revolution of time to spin to the same location. The hard drive controller can use this length of time of one revolution to attempt to detect and/or decode the 2 failed sector readings (e.g., before the re-read operation begins). This type of recovery is referred to as an offline data recovery operation.

In some embodiments, for an on-the-fly operation, the ITI removal procedure can be configured to initiate in response to an event (e.g., the Mth iteration of detecting and decoding and/or a detection of a certain type of feedback signal). In some embodiments, a recovery procedure can be performed for the received signal prior to detecting/decoding it with or without a parallel ITI removal procedure. Examples of recovery can include a sync mark search and a sequence of averaging one or more combinations of data (e.g., data read from the current data sector without ITI cancellation, data read from the current data sector with ITI cancellation, data averaged from the current data sector and one or more previously read data sectors without ITI cancellation, and data averaged from the current track and one or more previously read data sectors with ITI cancellation).

Figure 2:
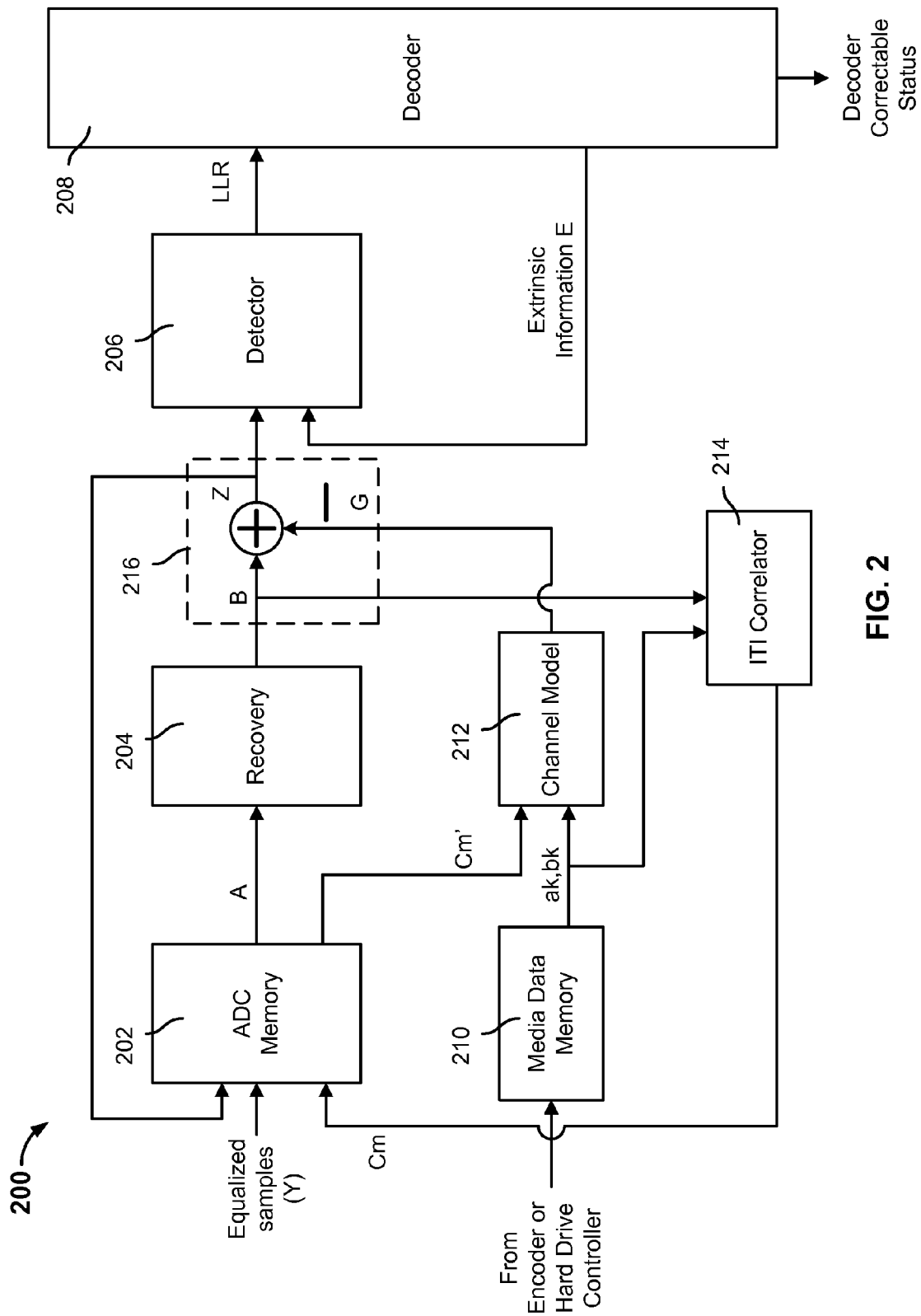
FIG. 2 is a diagram showing an embodiment of a system for reading data.

FIG. 2 is a diagram showing an embodiment of a system for reading data. In various embodiments, system 200 can be configured to be associated with a hard drive controller. In some embodiments, system 200 can be used to read data from one or more tracks (e.g., the tracks of FIG. 1) of a hard disk. In various embodiments, system 200 can be configured to perform recovery and/or ITI removal on received signals associated with a track that is being read. In some embodiments, system 200 can be configured to support an ITI removal procedure that is performed either offline (e.g., during a data recovery phase of certain data sectors that are determined to be undecodable) and/or on-the-fly (e.g., in line or parallel to the detecting and decoding of received signals). Parameters associated with system 200 and/or the hard disk controller thereof can be configured by a user to dictate if/when ITI removal is to be implemented over (e.g., in parallel with) one or more iterations of detecting and decoding input samples (e.g., B). In some embodiments, parameters associated with system 200 and/or the hard drive controller thereof can also be configured by a user to dictate whether one or more techniques of recovery is to be applied to input samples prior to performing one or more iterations of detecting and decoding on the samples. In some embodiments, parameters associated with system 200 and/or the hard drive controller thereof can be configured for any combination of performing recovery and applying ITI removal (e.g., for a particular track or disk sector).

In the example of FIG. 2, signals received for the data sector being read are processed by an analog process (not shown) and then equalized (e.g., by one or more filters) before being fed to ADC memory 202, which can store data samples for one or more data sectors. While memory 202 is shown to be an analog-to-digital converter (ADC) memory, memory 202 can also be any type of memory or storage that is capable of storing samples read from data sectors. In some embodiments, equalized samples are associated with data from a particular track of a hard disk (e.g., Track N of FIG. 1). In the example, equalized samples are referred as Y.

Equalized samples stored on ADC memory 202 are fetched (e.g., by an associated controller) as input samples A and fed into recovery block 204. In some embodiments, input samples A just pass through recovery block 204, without having a recovery procedure performed on them. In some embodiments, recovery block 204 will perform either or both of the recovery procedures of sync mark searching (SMS) or sample averaging. In some embodiments, if sync mark searching and/or sample averaging are performed, loop re-run can be applied at recovery block 204, which can perform one or more of the following: equalization, gain adjustment, timing adjustment and offset adjustment. In the example, samples that are processed by recovery block 204, whether or not a recovery procedure was applied, are referred to as recovery processed samples B.

If/when an ITI removal procedure is initiated (e.g., in response to a certain event), the first part, ITI correlation, is performed. During ITI correlation, recovery processed samples B and known/successfully decoded data from one or both adjacent tracks (e.g., Track N−1 and Track N+1 of FIG. 1) to the particular track being read (from which recovery processed samples B are derived) ak and/or bk are fetched (e.g., by the controller) and fed into ITI correlator 214. It is assumed that one or both adjacent tracks to the particular track being read were already known or have already been successfully decoded and that ak and bk correspond to output bit streams of the respective adjacent tracks. In some embodiments, output bit streams ak and bk are received from an encoder or a hard drive controller and stored at and fetched from media data memory 210. In various embodiments, ITI correlator 214 performs a correlation (e.g., cross correlation) operation on recovery processed samples B and ak and/or bk to produce one or more correlation coefficients that are stored as a coefficient vector Cm in ADC memory 202 (or any other memory or storage). One reason to perform such a correlation operation is to find the channel response. The channel response (comprising of coefficients) includes both magnitude and phase information. The phase information refers to the misalignment between the adjacent tracks because adjacent tracks are not typically perfectly aligned and of two adjacent tracks, one track usually lags behind the other by one or more bits. In various embodiments, ITI correlator 214 produces one or more correlation coefficients in parallel to at least one iteration of detecting and decoding input samples from which ITI information has not yet been cancelled. In some embodiments, a subset of all the possible correlation coefficients are produced by ITI correlator 214 per each iteration of detecting and decoding input samples from which ITI information has not yet been cancelled (e.g., until all the possible correlation coefficients have been computed). In some embodiments, a subset of the produced correlation coefficients is discarded (e.g., the coefficients whose values are very close to zero and therefore do not provide much information).

During the second part of an ITI removal procedure, ITI cancellation is performed. During ITI cancellation, a vector of coefficients Cm' (corresponding to the correlation between recovery processed samples B and output bit streams of one or more adjacent tracks) are fetched (e.g., by the controller) from ADC memory 202 (or wherever they are stored). In various embodiments, the vector of coefficients Cm' are fetched from ADC memory 202 prior to input samples A being read from ADC memory 202. The adjacent track output bit streams ak and/or bk and the vector of coefficients Cm' are fed into channel model 212 to generate ITI samples G. In some embodiments, channel model 212 can be implemented using a FIR filter. In some embodiments, ITI samples G can be written into ADC memory 202 (or any other memory or storage) so as to free up the corresponding media data buffer location in media data memory 210. At area 216 of system 200, ITI samples G are cancelled from recovery processed samples B to produce ITI cancelled samples Z, which will then be used in subsequent iterations of detecting (at detector 206) and decoding (at decoder 208). In some embodiments, ITI cancelled samples Z can also be stored at ADC memory 202 (or any other memory or storage). By storing ITI cancelled samples Z, such samples can be retrieved for subsequent iterations without the need to perform ITI cancellation again.

In various embodiments, detector 206 and decoder 208 operate in a loop configuration. In some embodiments, detector 206 is a soft-output Viterbi algorithm (SOVA) detector. In some embodiments, decoder 208 is a low density parity code (LDPC) decoder. In some embodiments, prior to the performance (e.g., by the controller) of cancelling ITI samples G from recovery processed samples B (or during the process of ITI correlation, when Cm are computed), recovery processed samples B (without ITI cancellation) are fed into detector 206 and the output from detector 206 is fed into decoder 208 to decode such data (e.g., to produce at least an indication of whether recovery processed samples B can be correctable). In some embodiments, subsequent to the performance of cancelling ITI samples G from recovery processed samples B, ITI cancelled samples Z are fed into the path of detector 206, and then outputs log-likelihood ratio LLR are fed to decoder 208. In some embodiments, decoder 208 produces extrinsic information E, which is fed back to detector 206. In various embodiments, a global iteration refers to the processing of recovery processed samples B or ITI cancelled samples Z with at least detector 206 (and its outputs with decoder 208), with or without extrinsic information E from decoder 208. An example of extrinsic information E is the "bias" information from a LDPC decoder to the Branch Metric Unit (BMU) of a SOVA detector.

As shown in the example, an ITI removal procedure (including ITI correlation and ITI cancellation) can be added in line between ADC memory 202 and detector 206 (e.g., to perform an on-the-fly operation) such that no modification is needed to either ADC memory 202 or detector 206 in an existing architecture with both of those components. By including the ITI removal procedure in line in system 200, ITI correlation and cancellation can be processed in parallel to the operation of detector 206 and thereby, not reduce the throughput of detector 206.

In some embodiments, the ITI removal procedure is not performed in parallel with one or more global iterations (e.g., during an offline operation) and so the components related to ITI removal (e.g., ITI correlator 214) do not need to be added in line to the architecture.

Figure 3:
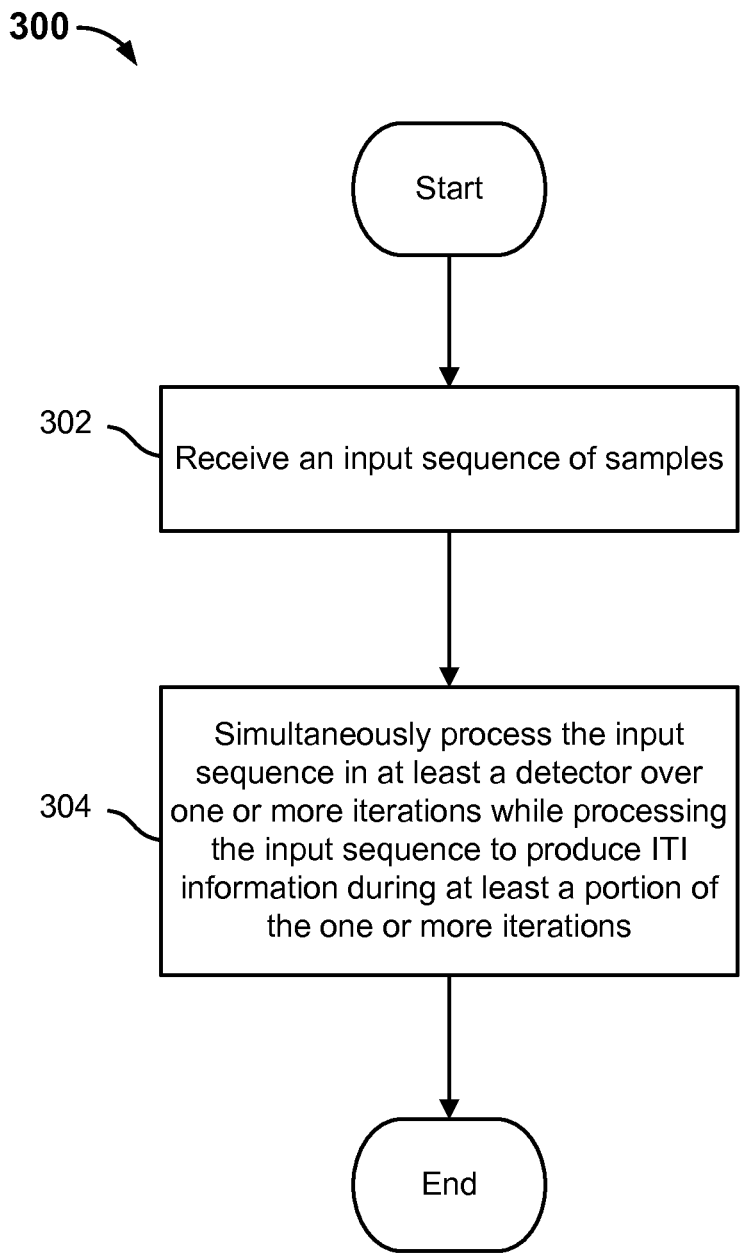
FIG. 3 is a flow diagram showing an embodiment of a process of reading data.

FIG. 3 is a flow diagram showing an embodiment of a process of reading data. In some embodiments, process 300 can be implemented, at least in part, using system 200. In some embodiments, process 300 can be implemented for an on-the-fly operation.

At 302, an input sequence of samples is received. In some embodiments, the input sequence was originally received as an analog signal that was read from a track of a hard disk. The analog signal was converted to digital samples (i.e., an input sequence of samples). In some embodiments, the input sequence of samples is equalized and then stored in memory. In some embodiments, one or more recovery procedures (e.g., sync mark searching and or sample averaging) are performed on the input sequence of samples.

At 304, the input sequence is simultaneously processed in at least a detector over one or more iterations while the input sequence is processed to produce ITI information during at least a portion of the one or more iterations. In some embodiments, in each global iteration, the input sequence is processed by a (e.g., SOVA) detector and whose outputs (e.g., LLR) are fed into a (e.g., LDPC) decoder. The decoder can produce an indication of whether the input sequence of samples is correctable or is uncorrectable or any other kind of determination.

In various embodiments, as the input sequence is processed in at least a detector over one or more iterations, it can be simultaneously processed (e.g., processed in parallel) to produce ITI information. In some embodiments, the input sequence is used with known data associated with one or both adjacent tracks to produce ITI information. For example, ITI information can include a set of ITI samples (e.g., ITI samples G of system 200) that are produced from known data associated with adjacent tracks and the (e.g., recovery processed) input sequence. In some embodiments, the ITI information (e.g., ITI samples G) is cancelled from the input sequence and the input sequence with ITI information cancelled out (e.g., ITI samples Z) is fed back to the detector for one or more iterations (e.g., until the information can be decoded by the decoder). In some embodiments, the ITI information is produced (e.g., the ITI removal procedure is initiated) in response to an event. For example, the event can be that the Mth global iteration is being performed (e.g., meaning that the input sequence was not determined to be correctable by the decoder over the previous M−1 global iterations). Also, for example, the event can be that a certain kind of feedback (e.g., LDPC uncorrectable status) was received (e.g., after a particular global iteration).

Figure 4:
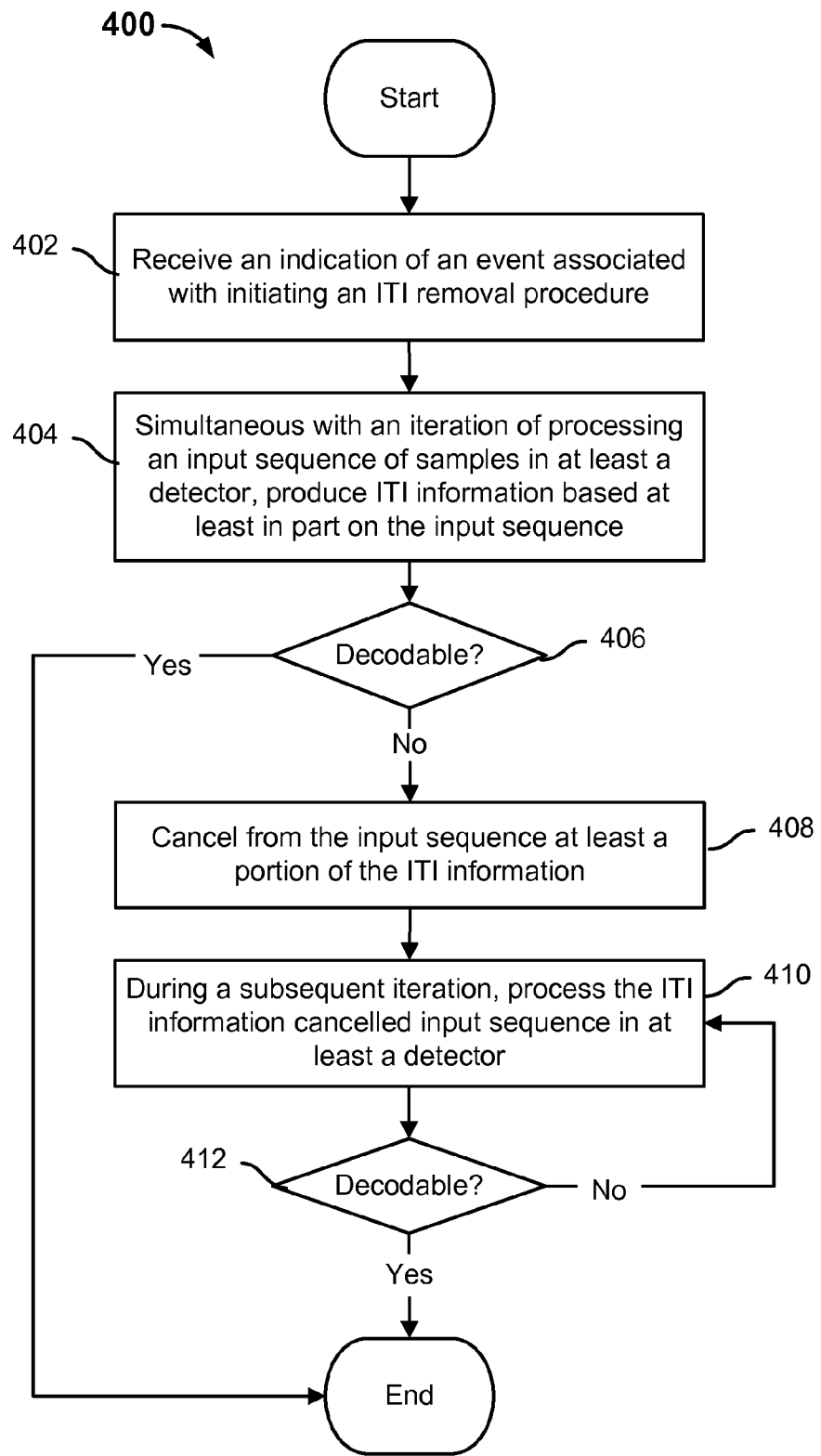
FIG. 4 is a flow diagram showing an embodiment of a process of ITI removal.

FIG. 4 is a flow diagram showing an embodiment of a process of ITI removal. In some embodiments, process 400 can be implemented using system 200.

At 402, an indication of an event associated with initiating an ITI removal procedure is received. For example, an event can be associated with a certain instance (e.g., the Mth instance) of the global iteration (of using the detector to process the input sequence) that a user has configured the parameters of the controller to use as a trigger to initiate an ITI removal procedure. In another example, an event can be associated with receiving a certain type of feedback (e.g., decoder uncorrectable status feedback) and, optionally, that occurs after a certain instance of the global iteration that a user has configured the parameters of the controller to use as a trigger to initiate an ITI removal.

At 404, simultaneous with an iteration of processing an input sequence of samples in at least a detector, ITI information is produced based at least in part on the input sequence. In some embodiments, the input sequence is associated with data on a track that is being read (e.g., by system 200). In some embodiments, one or more techniques of recovery have already been performed on the input sequence. For example, subsequent to receiving an indication of an event associated with initiating ITI removal procedure, ITI correlation is performed in parallel to at least one global iteration of processing the input sequence using the (e.g., SOVA) detector. The ITI information can be produced, for example, by performing a cross correlation operation using the input sequence and known data from one or both adjacent tracks to produce a set of cross correlation coefficients (e.g., Cm). Then, at least a subset of the produced correlation coefficients and known data from one or both adjacent tracks are fed into a channel model (e.g., a FIR filter) to produce ITI samples (e.g., G).

At 406, it is determined whether the input sequence (without ITI cancellation) is decodable. In various embodiments, an input sequence is decodable if the decoder outputs an indication that the data is correctable. In various embodiments, at 406, it is determined whether the input sequence that was processed in parallel to at least a portion of the production of ITI information at 404 is decodable. In the event that the input sequence (from which ITI information has not yet been cancelled) is decodable, then process 400 ends (because the purpose of cancelling ITI information from the input sequence is to increase the likelihood that the data becomes decodable, which has now already been accomplished so it is no longer necessary to perform ITI cancellation). In the event that the input sequence without ITI cancellation is not decodable, then control passes to 408.

At 408, at least a portion of the ITI information is cancelled from the input sequence. In some embodiments, the ITI information is cancelled from the (e.g., recovery processed) input sequence (e.g., that is read from ADC memory) before the input sequence is fed to the (e.g., SOVA) detector.

At 410, during a subsequent iteration, the ITI information cancelled input sequence is processed in at least a detector. In some embodiments, the input sequence from which ITI information was cancelled at 406 is fed to the detector during a global iteration subsequent to the global iteration during which at least a portion of the ITI information was produced. In some embodiments, the ITI information cancelled input sequence is stored (e.g., at ADC memory) so that it can be retrieved and used in subsequent iterations. In some embodiments, outputs of the detector is fed to a (e.g., LDPC) decoder.

At 412, it is determined whether the ITI cancelled input sequence is decodable. In various embodiments, it is determined by the decoder whether the ITI cancelled input sequence is correctable. In the event that the ITI cancelled input sequence was not determined to be correctable, control passes to 410, where the ITI cancelled input sequence is (e.g., retrieved from storage) processed again. In the event the ITI cancelled input sequence was determined to be correctable, process 400 ends.

As mentioned above, a user can configure the parameters of a system such as system 200 to initiate an ITI removal procedure in response to an event. For example, one motivation to granting a user the ability to configure if/when an ITI removal procedure is to be initiated is to allow the user to decide between the tradeoff of using an ITI removal procedure to increase the likelihood of decoding an input sequence through fewer global iterations but consume more power as a result of initiating ITI removal. To illustrate this concept, consider the following power consumption formula:

$$\text{Power} = n_{LDPC}(\text{LDPC}_{power} + \text{SOVA}_{power}) + (n\text{LDPC} - k)\text{ITI}_{power}$$

Where Power is the power consumed for successfully decoding the unknown data associated with a track that is being read; $n_{LDPC}$ is the number of global iterations of using a SOVA detector and LDPC decoder it takes to successfully decode the unknown data associated with a track that is being read; $\text{SOVA}_{power}$ is the power consumption for an iteration of detecting using the SOVA detector; $\text{LDPC}_{power}$ is the power consumption for an iteration of decoding using the LDPC detector; and k= is the kth global iteration in which ITI removal procedure was initiated. Generally, the magnitude of $(\text{LDPC}_{power} + \text{SOVA}_{power})$ is much greater than the magnitude of $\text{ITI}_{power}$. Ideally, a user desires to save as much power as possible, which can be done by adjusting the ITI removal procedure configurations such that the global iterations associated with $(\text{LDPC}_{power} + \text{SOVA}_{power})$ and/or $\text{ITI}_{power}$ are minimized. Because $\text{ITI}_{power}$ is not incurred until an ITI removal procedure is initiated, a user may desire, in some instances (e.g., when the SNR is high), to not use ITI removal (and save power while the ITI correlation/cancellation is turned off until the procedure is invoked) until one or more global iterations of detecting/decoding without the ITI removal procedure proves to be unsuccessful. While in some other instances (e.g., when the SNR is low), a user may desire to use ITI removal at an earlier global iteration with the hope that using ITI cancellation can reduce the overall number of global iterations through the SOVA detector and LDPC decoder (which could save power overall) it takes to successfully decode the data.

Figure 5:
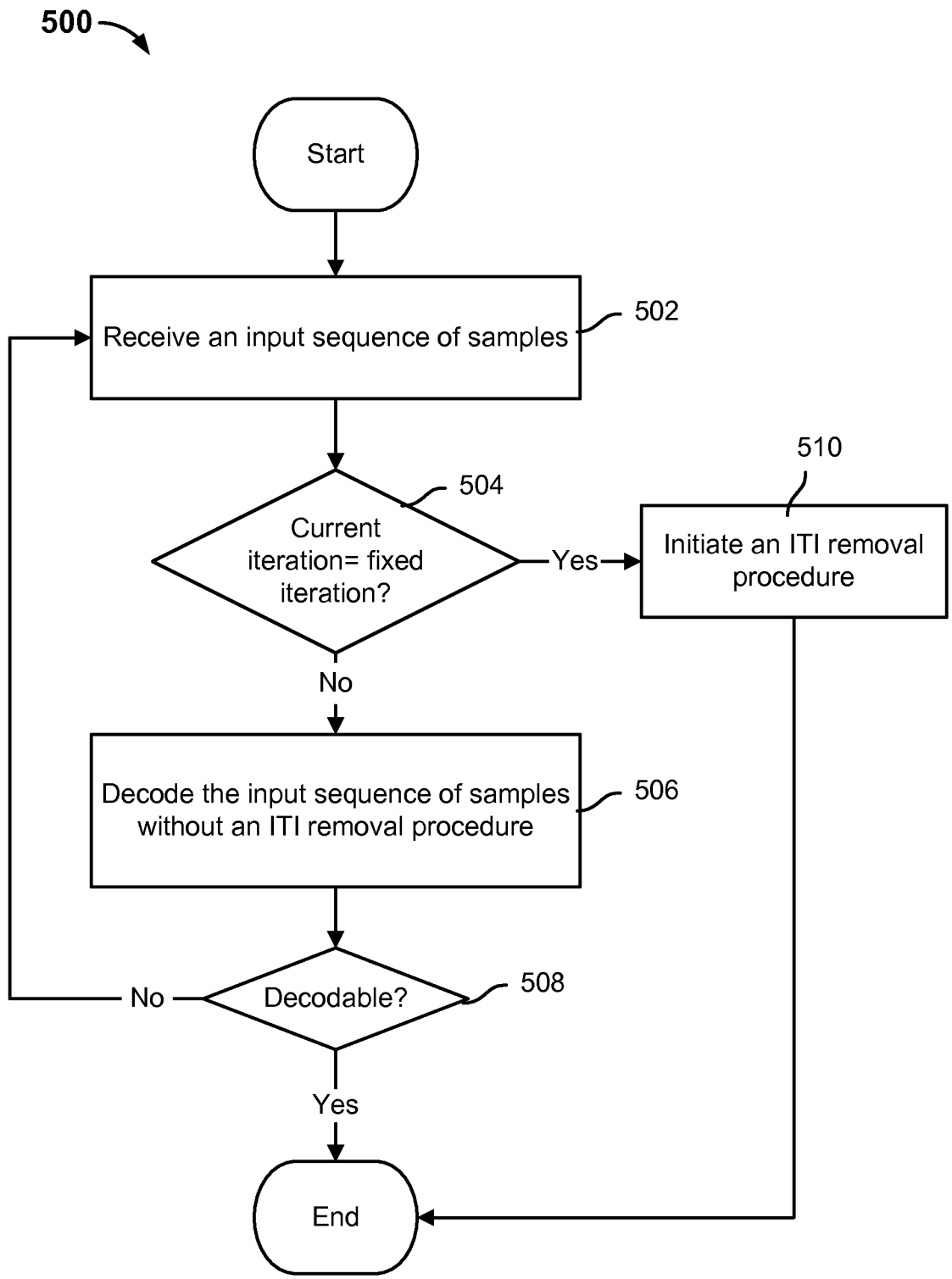
FIG. 5 is a flow diagram showing an embodiment of a process of starting an ITI removal procedure at a fixed iteration.

FIG. 5 is a flow diagram showing an embodiment of a process of starting an ITI removal procedure at a fixed iteration. In some embodiments, process 500 can be implemented, at least in part, using system 200. For example, process 500 can be configured by a user adjusting one or more parameters associated with system 200.

At 502, an input sequence of samples is received. In some embodiments, the input sequence of samples is associated with a track of a hard disk that is being read. In some embodiments, the input sequence of samples has been equalized. In some embodiments, the input sequence is retrieved from a form of storage (e.g., an ADC memory). In some embodiments, one or more techniques of recovery are also applied to the input sequence.

At 504, it is determined whether the current iteration is equal to the fixed iteration. As used herein, the fixed iteration refers to the particular global iteration (of processing the input sequence with at least a detector) to which the ITI correlation process is performed in parallel. In various embodiments, the fixed iteration is selected by a user at one or more configurable parameters of system 200.

For example, in a system where the detector used is a SOVA detector and the decoder used is a LDPC detector, we can define SOVA[n] as the SOVA detector processing at global iteration number "n," where n is a natural number starting from 1. Furthermore, LDPC[n] can be defined as the LDPC processing after SOVA[n]. A user can choose to initiate an ITI removal procedure (e.g., to perform the ITI correlation process and subsequently, the ITI cancellation process) in parallel to a particular global iteration (e.g., a "fixed iteration"). For example, the user can choose to start an ITI correlation process at global iteration number M.

As applied to process 500, it is determined at 504 whether the current iteration (n) is equal to the fixed iteration (M), where M is a user-configured value. If so, control passes to 510, where an ITI removal procedure is initiated. In various embodiments, 504 and 510 can be implemented, at least in part, with process 400. At 510, for example, once it has been determined that SOVA[n=M], the ITI correlation process is performed where a set of correlation coefficients Cm is computed in parallel to SOVA[M] processing. Also at 510, for example, Cm will be used to produce ITI samples G where n≥M. ITI cancellation (where ITI samples G are cancelled from the input sequence), in this example, will be computed at SOVA[n=M+1]. In some embodiments, the ITI cancelled samples Z can be written to ADC memory or another form of storage so they can be fetched to be used in subsequent SOVA operations (SOVA[n], where n>(M+1)). In some embodiments, at 510, once the ITI cancelled input sequence is repeatedly SOVA/LDPC processed until the LDPC decoder determines that it is correctable.

In the event that at 504, the current global iteration is not equal to the fixed iteration (i.e., SOVA[n<M]), then control passes to 506. At 506, the input sequence of samples is decoded without an ITI removal procedure. Because the condition of n=M was not satisfied, ITI information (e.g., Cm and ITI samples G) are not produced nor cancelled from the input sequence and the input sequence is SOVA processed without ITI cancellation.

At 508, it is determined whether the input sequence of samples without ITI cancellation is decodable. In some embodiments, an input sequence is decodable if the (e.g., LDPC) decoder outputs an indication that the data is correctable. In the event that the decoder outputs an indication that the data is not correctable, then control passes back to 502, where the input sequence is received and goes through SOVA processing at global iteration [n+1]. In the event that the decoder outputs an indication that the data is correctable, then process 500 ends.

In some embodiments, a user can choose to use the fixed iteration technique (e.g., such as process 500) to perform ITI correlation and ITI cancellation as early as possible (e.g., by choosing a low value for M such as M=0) in a scenario where SNR is low, for example. This way, the overall SOVA/LDPC global iterations may be reduced because ITI is cancelled in earlier iterations, which could increase the likelihood that the data will be decodable earlier.

Figure 6:
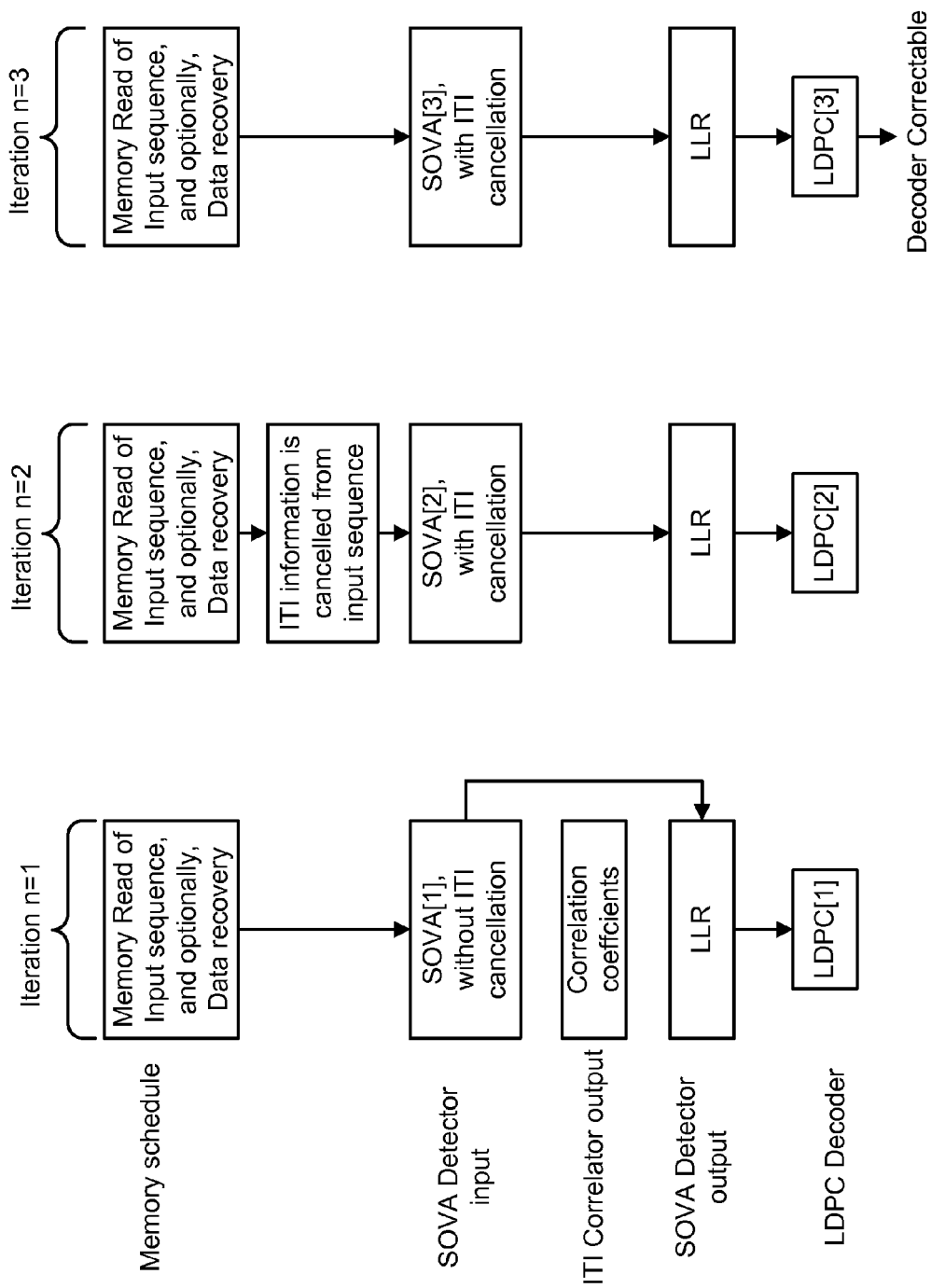
FIG. 6 is an example showing a schedule of processing an input sequence with an ITI removal procedure starting at a fixed iteration.

FIG. 6 is an example showing a schedule of processing an input sequence with an ITI removal procedure starting at a fixed iteration. In the example, the ITI removal procedure is user-configured to start at M=1 at global iteration of n=1 (i.e., SOVA[1]). M is selected to be 1 in this example for merely illustrative purposes; M can be selected to be any natural number greater than 1 as well. In some embodiments, the example of FIG. 6 can be implemented using process 500. In some embodiments, the example of FIG. 6 can be implemented using system 200.

In the example, at global iteration n=1, an (e.g., equalized) input sequence associated with data at a track of a hard disk is read from ADC memory. In some embodiments, one or more techniques of recovery (e.g., sync mark searching and sample averaging) may be applied to the input sequence. The input sequence without ITI cancellation is then fed to a detector (a SOVA detector in this example) for a first iteration of SOVA processing (SOVA[1]). Simultaneous with (e.g., in parallel to) the first iteration of SOVA processing, the ITI correlation process is started (because the M=1 and n=M) and the input sequence and known data from one or both adjacent tracks are input into an ITI correlator, which outputs one or more correlation coefficients (e.g., Cm). In some embodiments, the one or more correlation coefficients are written to ADC memory (or any other form of memory or storage) so that they can be retrieved later. The outputs of the SOVA detector after SOVA processing include LLR, which are fed into a decoder (a LDPC decoder in this example) for a first iteration of LDPC decoding (LDPC[1]). In some embodiments, the LDPC decoder processes the LLR, and in some embodiments other information as well, and outputs at least an indication of whether the data is correctable. In the example, after LDPC [1], an indication other than "correctable" data is output.

At global iteration n=2, the input sequence is read from ADC memory and one or more techniques of recovery may be applied to the input sequence. Since ITI correlation has already been performed at the previous iteration (n=1), ITI information (e.g., ITI samples G) can be produced from the stored ITI correlation coefficients (and known data from one or more adjacent tracks). In some embodiments, the ITI information can be stored so that it may be retrieved (instead of re-calculated) in subsequent iterations. The produced ITI information is cancelled from the input sequence after it is read from ADC memory. In some embodiments, the ITI cancelled samples (Z) can also be stored (e.g., at ADC memory) so that ITI cancellation would not need to be performed again for subsequent global iterations (SOVA[n], where n>(M+1)). The ITI cancelled input sequence is then fed into the SOVA detector for a second iteration of SOVA processing (SOVA [2]). The outputs of the SOVA detector after SOVA processing include LLR, which are fed into the LDPC decoder for the second iteration of the LDPC decoding. In the example, after LDPC[2], an indication other than "correctable" data is output.

At global iteration n=3, the input sequence is read from ADC memory and one or more techniques of recovery may be applied to the input sequence. ITI information can be retrieved from storage and used to cancel from the input sequence after it is read from ADC memory. Or, the ITI cancelled samples can be retrieved from storage. The ITI cancelled input sequence is then fed into the SOVA detector for a third iteration of SOVA processing (SOVA[3]). The outputs of the SOVA detector after SOVA processing include LLR, which are fed into the LDPC decoder for the third iteration of the LDPC decoding. In the example, after LDPC [3], an indication of correctable data is output and so the input sequence does not need to go through a subsequent iteration of SOVA/LDPC processing.

Figure 7:
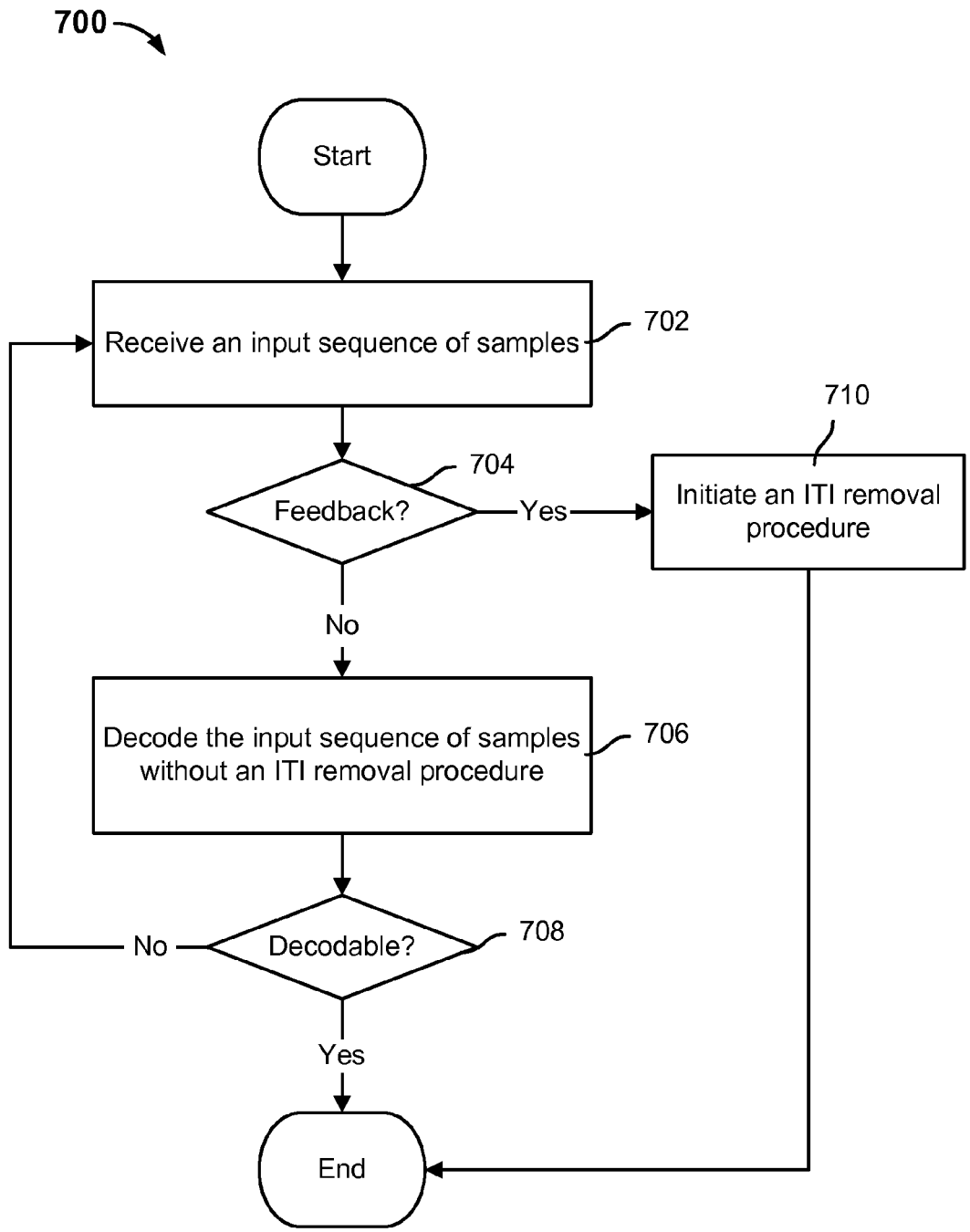
FIG. 7 is a flow diagram showing an embodiment of a process of starting an ITI removal procedure in response to receiving a certain type of feedback.

FIG. 7 is a flow diagram showing an embodiment of a process of starting an ITI removal procedure in response to receiving a certain type of feedback. In some embodiments, process 700 can be implemented, at least in part, using system 200. For example, process 700 can be configured by a user adjusting one or more parameters associated with system 200.

At 702, an input sequence of samples is received. In some embodiments, the input sequence of samples is associated with a track of a hard disk that is being read. In some embodiments, the input sequence of samples has been equalized. In some embodiments, the input sequence is retrieved from a form of storage (e.g., an ADC memory). In some embodiments, one or more techniques of recovery are also applied to the input sequence.

At 704, it is determined whether a feedback that is configured to trigger an ITI removal procedure is detected. As used herein, a feedback that is configured to trigger an ITI removal is any one or combination of feedback that a user has designated to initiate the ITI correlation process. In various embodiments the feedback can be configured by a user to be one or more following of the following: LDPC feedback, LLR, intermediary feedback, SOVA detector feedback, a number of parity check equations that are violated, extrinsic information from LDPC decoder, or any combination of the above. In some embodiments, an ITI removal procedure is initiated in response to the detection of the selected feedback at a particular global iteration, which can also be configured by a user. Any appropriate technique of detecting the selected feedback may be used. In various embodiments, the one or combination of feedback and/or the detection of the feedback at a particular global iteration is selected by a user at one or more configurable parameters of system 200.

For example, in a system where the detector used is a SOVA detector and the decoder used is a LDPC detector, we can define SOVA[n] as the SOVA detector processing at global iteration number "n," where n is a natural number starting from 1. Furthermore, LDPC[n] can be defined as the LDPC processing after SOVA[n]. A user can choose to perform ITI correlation after a LDPC status of "uncorrectable" is received after a global iteration n=M is performed, wherein M is a user-configured value. So, if the feedback from the LDPC decoder after LDPC[M] is "uncorrectable," then ITI correlation (computation of Cm) is performed in parallel to SOVA [M+1] (the next global iteration).

As applied to process 700, it is determined at 704 whether the selected feedback (e.g., LDPC status of "uncorrectable" data) is received after LDPC[M], where M is a user-configured value. If so, control passes to 710, where an ITI removal procedure is initiated. In various embodiments, 704 and 710 can be implemented, at least in part, with process 400. At 710, for example, once it has been determined that the selected feedback has been received after LDPC[M], the ITI correlation process is performed at the next iteration (n=M+1) where a set of correlation coefficients Cm is computed in parallel to SOVA[M+1] processing. Also at 710, for example, Cm will be used to produce ITI samples G where n≥(M+1). ITI cancellation (where ITI samples G are cancelled from the input sequence), in this example, will be computed at SOVA[n=M+2]. In some embodiments, the ITI cancelled samples Z can be written to ADC memory or another form of storage so they can be fetched to be used in subsequent SOVA operations (SOVA[n], where n>(M+2)). In some embodiments, at 710, once the ITI cancelled input sequence is repeatedly SOVA/LDPC processed until the LDPC decoder determines that it is correctable.

In the event that at 704, the selected feedback is not received after LDPC[M], then control passes to 706. At 706, the input sequence of samples is decoded without an ITI removal procedure. Because the condition of the feedback being received after LDPC[M] was not satisfied, ITI information (e.g., Cm and ITI samples G) are not produced nor cancelled from the input sequence and the input sequence is SOVA processed without ITI cancellation.

At 708, it is determined whether the input sequence of samples without ITI cancellation is decodable. In some embodiments, an input sequence is decodable if the (e.g., LDPC) decoder outputs an indication that the data is correctable. In the event that the decoder outputs an indication that the data is not correctable, then control passes back to 702, where the input sequence is received and goes through SOVA processing at global iteration [n+1]. In the event that the decoder outputs an indication that the data is correctable, then process 700 ends.

In some embodiments, a user can choose to use the feedback technique (e.g., such as process 700) to perform ITI correlation and ITI cancellation only when necessary (e.g., the data remains uncorrectable even after M global iterations) in a scenario where SNR is high, for example. This way, the hardware of the ITI correlation and cancellation can be turned off for a M number of global iterations, which could save power consumption.

Figure 8:
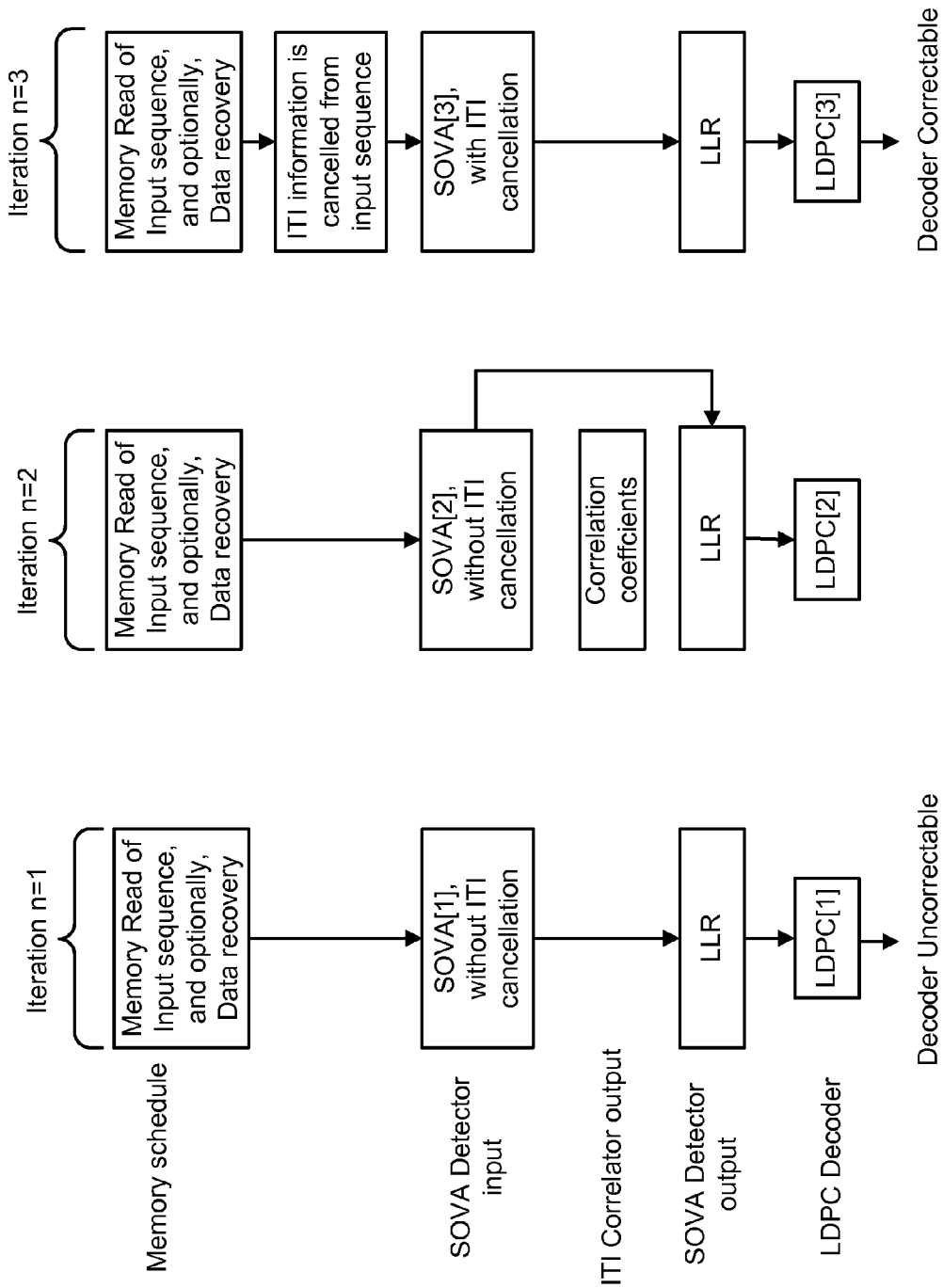
FIG. 8 is an example showing a schedule of processing an input sequence with an ITI removal procedure starting in response to detecting a selected feedback after a particular global iteration.

FIG. 8 is an example showing a schedule of processing an input sequence with an ITI removal procedure starting in response to detecting a selected feedback after a particular global iteration. In the example, the ITI removal procedure is configured to start after LDPC[n=M=1] returns a feedback of "uncorrectable" data, where M is user-configured value. M is selected to be 1 in this example for merely illustrative purposes; M can be selected to be any natural number greater than 1 as well. In some embodiments, the example of FIG. 8 can be implemented using process 700. In some embodiments, the example of FIG. 8 can be implemented using system 200.

In the example, at global iteration n=1, an (e.g., equalized) input sequence associated with data at a track of a hard disk is read from ADC memory. In some embodiments, one or more techniques of recovery (e.g., sync mark searching and sample averaging) may be applied to the input sequence. The input sequence without ITI cancellation is then fed to a detector (a SOVA detector in this example) for a first iteration of SOVA processing (SOVA[1]). The outputs of the SOVA detector after SOVA processing include LLR, which are fed into a decoder (a LDPC decoder in this example) for a first iteration of LDPC decoding (LDPC[1]). In some embodiments, the LDPC decoder processes the LLR, and in some embodiments other information, and outputs at least an indication of whether the data is correctable. In the example, after LDPC [1], an indication of "uncorrectable" data is output. The LDPC feedback of "uncorrectable" data after LDPC[1] will trigger the start of the ITI removal process at the next global iteration n=2.

At global iteration n=2, the input sequence is read from ADC memory and one or more techniques of recovery may be applied to the input sequence. Simultaneous with (e.g., in parallel to) the second iteration of SOVA processing (SOVA [2]), the ITI correlation process is started (because in the previous iteration, LDPC[1] outputted a feedback of "uncorrectable" data) and the input sequence and known data from one or both adjacent tracks are input into an ITI correlator, which outputs one or more correlation coefficients (e.g., Cm). In some embodiments, the one or more correlation coefficients are written to ADC memory (or any other form of memory or storage) so that they may be retrieved later. The input sequence without ITI cancellation is then fed to a detector (a SOVA detector in this example) for a second iteration of SOVA processing (SOVA[2]). The outputs of the SOVA detector after SOVA processing include LLR, which are fed into a decoder (a LDPC decoder in this example) for a second iteration of LDPC decoding (LDPC[2]). In some embodiments, the LDPC decoder processes the LLR, and in some embodiments, other information and outputs at least an indication of whether the data is correctable. In the example, after LDPC[2], an indication other than "correctable" data is output.

At global iteration n=3, the input sequence is read from ADC memory and one or more techniques of recovery may be applied to the input sequence. Since ITI correlation has already been performed at the previous iteration (n=2), ITI information (e.g., ITI samples G) can be produced from the stored ITI correlation coefficients (and known data from one or more adjacent tracks). In some embodiments, the ITI information (e.g., ITI samples G) can be stored so that it may be retrieved (instead of re-calculated) in subsequent iterations. The produced ITI information (e.g., ITI samples G) is cancelled from the input sequence after it is read from ADC memory. In some embodiments, the ITI cancelled samples can also be stored (e.g., at ADC memory) and retrieved to be used in subsequent iterations. The ITI cancelled input sequence is then fed into the SOVA detector for a third iteration of SOVA processing (SOVA[3]). The outputs of the SOVA detector after SOVA processing include LLR, which are fed into the LDPC decoder for the third iteration of the LDPC decoding. In the example, after LDPC[3], an indication of "correctable" data is output and so the input sequence does not need to go through a subsequent iteration of SOVA/LDPC processing.

Figure 9A:
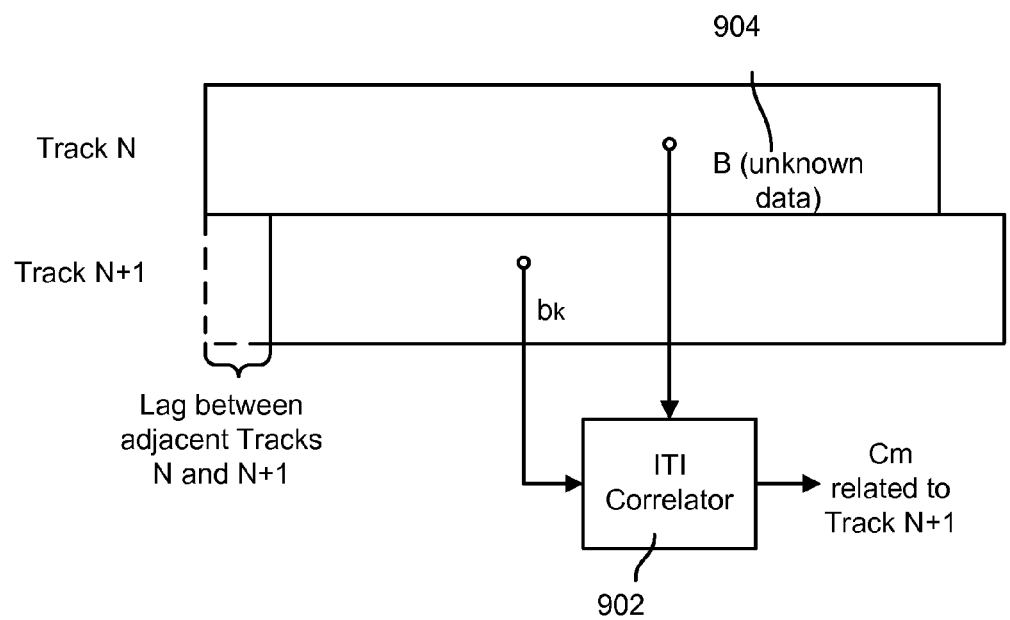
FIG. 9A is a diagram showing an example of performing ITI correlation coefficients between two adjacent tracks.

FIG. 9A is a diagram showing an example of performing ITI correlation coefficients between two adjacent tracks. In various embodiments, performing ITI correlation is the first part of the ITI removal procedure. The example shows two adjacent tracks, Track N and Track N+1. Typically, two adjacent tracks in a sector of a hard disk are not perfectly aligned; the two tracks are usually off from each other by one or more bits. By performing cross correlation on the data of two adjacent tracks, the channel response, which includes both magnitude and phase information, can be determined. While only one adjacent track (Track N+1) is shown in the example, both adjacent tracks (e.g., Track N−1 and Track N+1) can be used to compute correlation coefficients. In some embodiments, a channel response between Track N and Track N+1 (which is a first set of coefficients) and a channel response between Track N and Track N−1 (which is a second set of coefficients) can be determined.

Assume that Track N is currently being read by a system such as system 200 and that Track N+1 has already been read and successfully decoded (i.e., the correct data associated with Track N+1 is known). In the example, the known data associated with Track N+1 is referred to as samples bk. Because Track N is still being read and has not yet been decoded, its associated data is still unknown and is referred to as input sequence B (unknown data) 904. Input sequence B (unknown data) 904 and known samples bk are both fed into ITI correlator 902 (e.g., ITI correlator 214 of system 200) where ITI correlator 902 performs a cross correlation operation on the input data to produce one or more correlation coefficients Cm (which can also be referred to as taps) that represent the channel response between the two tracks of Track N and Track N+1. In various embodiments, at least a subset of the produced correlation coefficients Cm will be used to produce the ITI information (e.g., ITI samples G) that can be used to cancel from input sequence B (unknown data) 904 before the input sequence is fed into a (e.g., SOVA) detector.

Figure 9B:
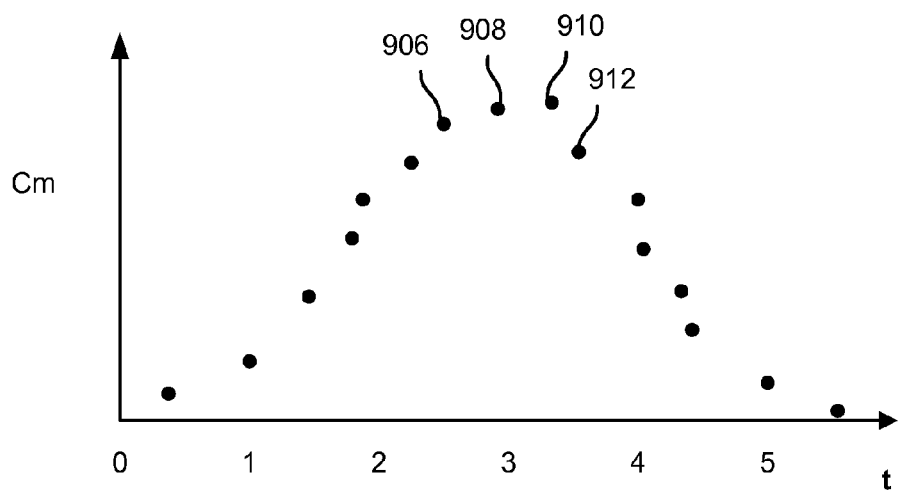
FIG. 9B is a diagram showing an example of a plot of computed correlation coefficients Cm.

FIG. 9B is a diagram showing an example of a plot of computed correlation coefficients Cm. In some embodiments, of the computed Cm (such as those computed from the example of FIG. 9A), only a subset with the highest energies will be used to produce ITI information (e.g. ITI samples G).

In the example, assume that that 16 total coefficients are computed (e.g., over at least one iteration of SOVA detector processing). The 16 total coefficients are plotted in the example (e.g., where the x-axis represents a time index and the y-axis represents the value normalized to the scale of ITI cancelled sample Z). The 16 coefficients each represent one of the 16 possible alignments/lags between the two adjacent tracks (e.g., Track N and Track N+1 of the example of FIG. 9A). However, only coefficients 906, 908, 910, and 912 are chosen to use to produce ITI information because they have the highest energies. While in this example, there are 16 possible coefficients to represent the channel response of the two adjacent tracks, there could be any other appropriate number of possible coefficients in practice. In various embodiments, although many Cm could be computed, only a subset is chosen because many of them could be very close to zero and are thereby not helpful in computing the ITI information.

In some embodiments, all the possible coefficients are computed in parallel to multiple global iterations of processing the input sequence. One benefit to computing all the possible coefficients over multiple detector processing iterations is to save power over each detector processing iteration and/or reduce hardware. For example, if there are 16 possible coefficients, four coefficients could be computed in parallel to each iteration of processing the input sequence with the SOVA detector and so after four SOVA processing iterations, all 16 possible coefficients would be computed. Then, in some embodiments, a subset of the 16 possible coefficients (e.g., those with the highest energies) is selected to be used to produce the ITI information (e.g., ITI samples G). In some embodiments, if the desired coefficients (e.g., those with the highest energies or meet another condition configured by a user) are computed before all the possible coefficients are computed, then the remaining possible coefficients need not be computed over further iterations of SOVA processing.

In some embodiments, the desired subset of coefficients to be used in producing ITI information (e.g., ITI samples G) can be selected using a variety of techniques. For example, once all the possible coefficients are computed, only those above a certain threshold can be selected. In another example, a sliding window can be placed on a plot of all the computed coefficients to find the subset of those with the highest energies and this subset will be selected. In another example, information is used from the recovery technique of a sync mark search to determine the subset of the computed coefficients to select. One or more iterations of a sync mark search could provide input S1 for one track and input S2 for an adjacent track, and each could represent the sync mark (a sync mark represents the beginning of the data of a track relative to the servo wedge) count relative to a servo wedge. The difference (A) between S1 and S2 could be stored and later retrieved to determine which of the computed coefficients fall within the A. Those that meet this condition will be selected to be used in producing ITI information. In another example, a certain range for which it is presumed that the peak coefficient values are likely to be found is used to detect the desired, computed coefficients. However, if desired coefficients (of a sufficient number of them) cannot be found within the initial range, then the range can be repeatedly expanded until the desired number of coefficients can be found and selected to be used in producing ITI information.

Figure 10:
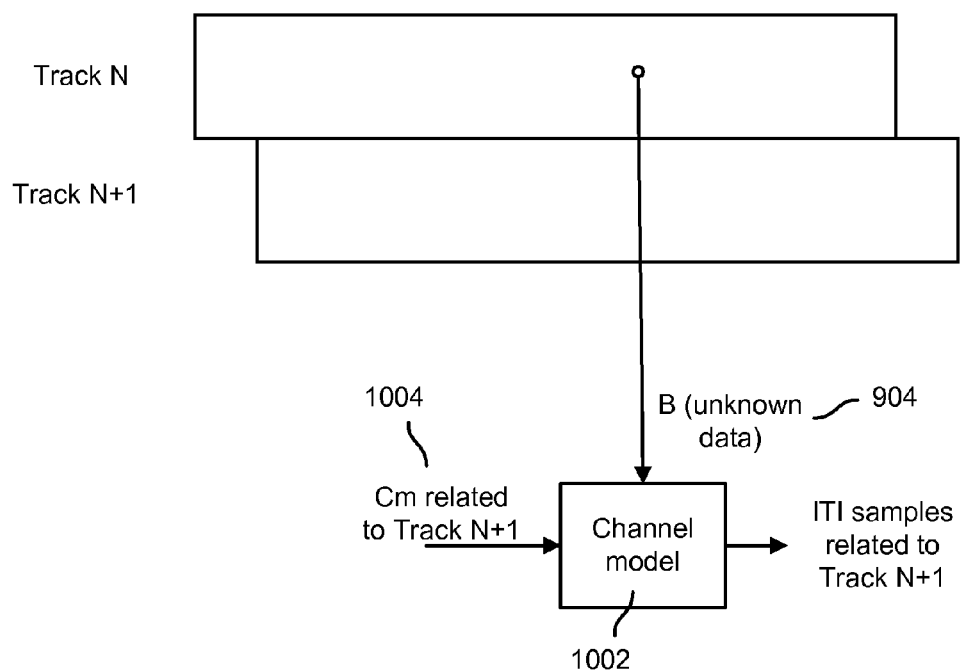
FIG. 10 is a diagram showing an example of computing ITI information.

FIG. 10 is a diagram showing an example of computing ITI information. In various embodiments, the computed ITI information (e.g., ITI samples G) is cancelled from the input sequence in the second part of the ITI removal procedure. The example shows two adjacent tracks, Track N and Track N+1, which can be assumed to be the same tracks from the example of FIG. 9A. While only one adjacent track (Track N+1) is shown in the example, both adjacent tracks (e.g., Track N−1 and Track N+1) can be used to compute ITI information (e.g., ITI samples G) to cancel ITI from both adjacent tracks from Track N.

Assume that Track N is currently being read by a system such as system 200 and that Track N+1 has already been read and successfully decoded (i.e., the correct data associated with Track N+1 is known). Cm related to Track N+1 1004 is at least a subset of the correlation coefficients computed in an ITI correlation process (such as the ITI correlation process from the example of FIG. 9A). Cm 1004 and the associated input sequence B (unknown data) 904 of Track N are input into channel model 1002 to produce ITI samples that model the ITI from Track N+1. In some embodiments, channel model 1002 can be implemented with a FIR filter. In some embodiments, channel model 1002 uses the coefficients Cm 1004 from the ITI correlation process to produce a magnitude and phase shift to better align the samples from Track N+1 with the samples of Track N. In various embodiments, the produced ITI samples are cancelled from an input sequence before it is fed into a (e.g., SOVA) detector during a global iteration subsequent to the last global iteration where ITI correlation (e.g., correlation coefficients) were computed in parallel to SOVA processing.

Figure 11:
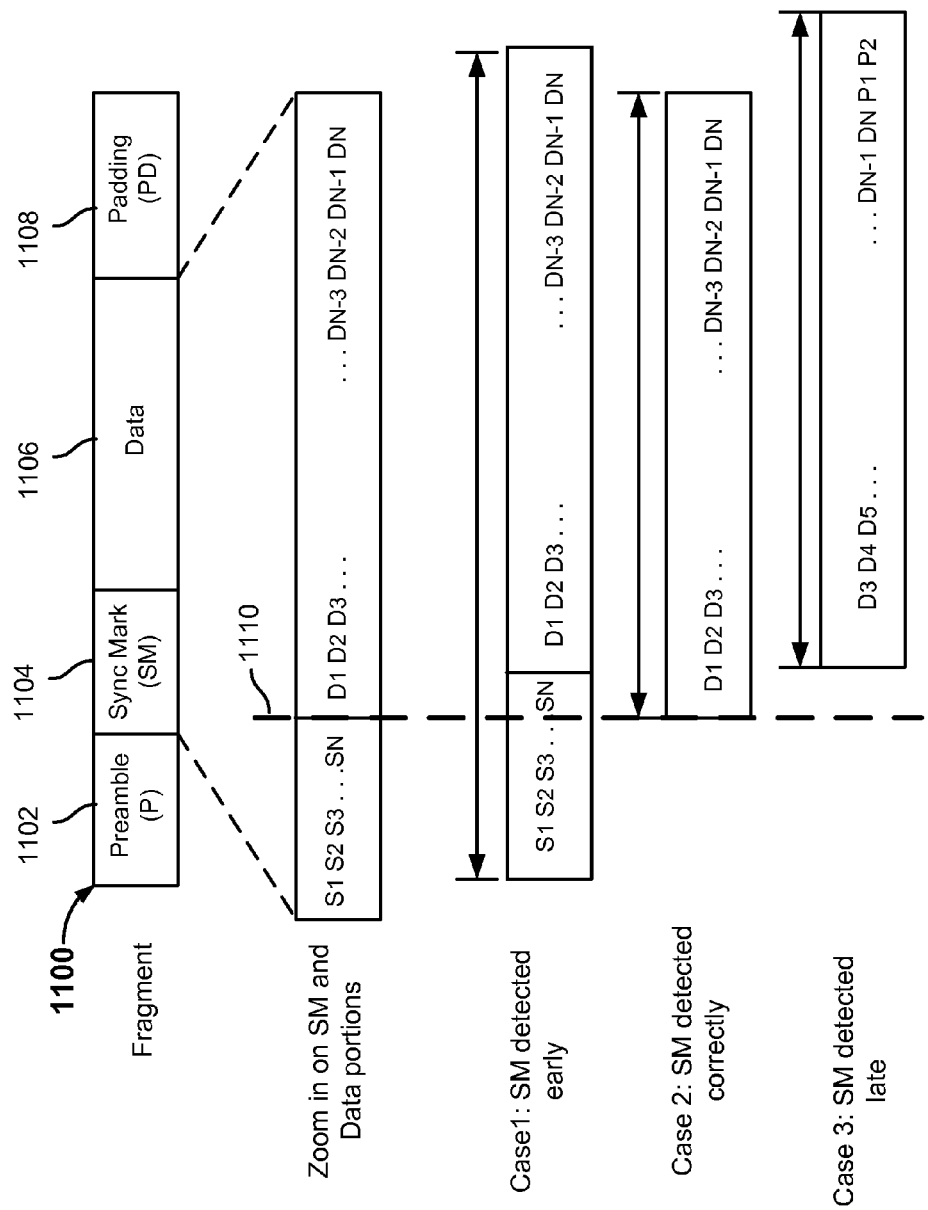
FIG. 11 shows an example of a fragment of a data sector and three example cases of detecting the sync mark of a fragment.

FIG. 11 shows an example of a fragment of a data sector and three example cases of detecting the sync mark of a fragment. In a hard disk drive, each data sector is usually split into multiple fragments. Each fragment stores a portion of the data in each data sector. In a typical disk drive, the typical number of fragments can be in the range of 3 to 8. Fragment 1100 shows an example of the format of a typical hard disk sector fragment. Preamble (P) 1102 is usually used for phase synchronization. Sync Mark (SM) 1104 is used for bit synchronization. Data 1106 represents user data. Padding (PD) 1108 represents padding that is used to terminate Viterbi trellis in detecting/decoding with a SOVA detector/decoder.

Due to the possible existence of defects on the media of the hard drive, the SM may be corrupted and may not be detected correctly. In the example, dashed line 1110 represents the correct location along a fragment such as fragment 1100 at which the SM should be detected. In case 1, the SM is detected early by one or more bits. In case 2, the SM is detected correctly. In case 3, the SM is detected late by one or more bits. Typically, the user data cannot be decoded when the SM is detected either early (e.g., case 1) or late (e.g., case 3). However, a recovery procedure can be invoked to recover user data in these scenarios, such as the technique of a sync mark search as discussed below.

Figure 12:
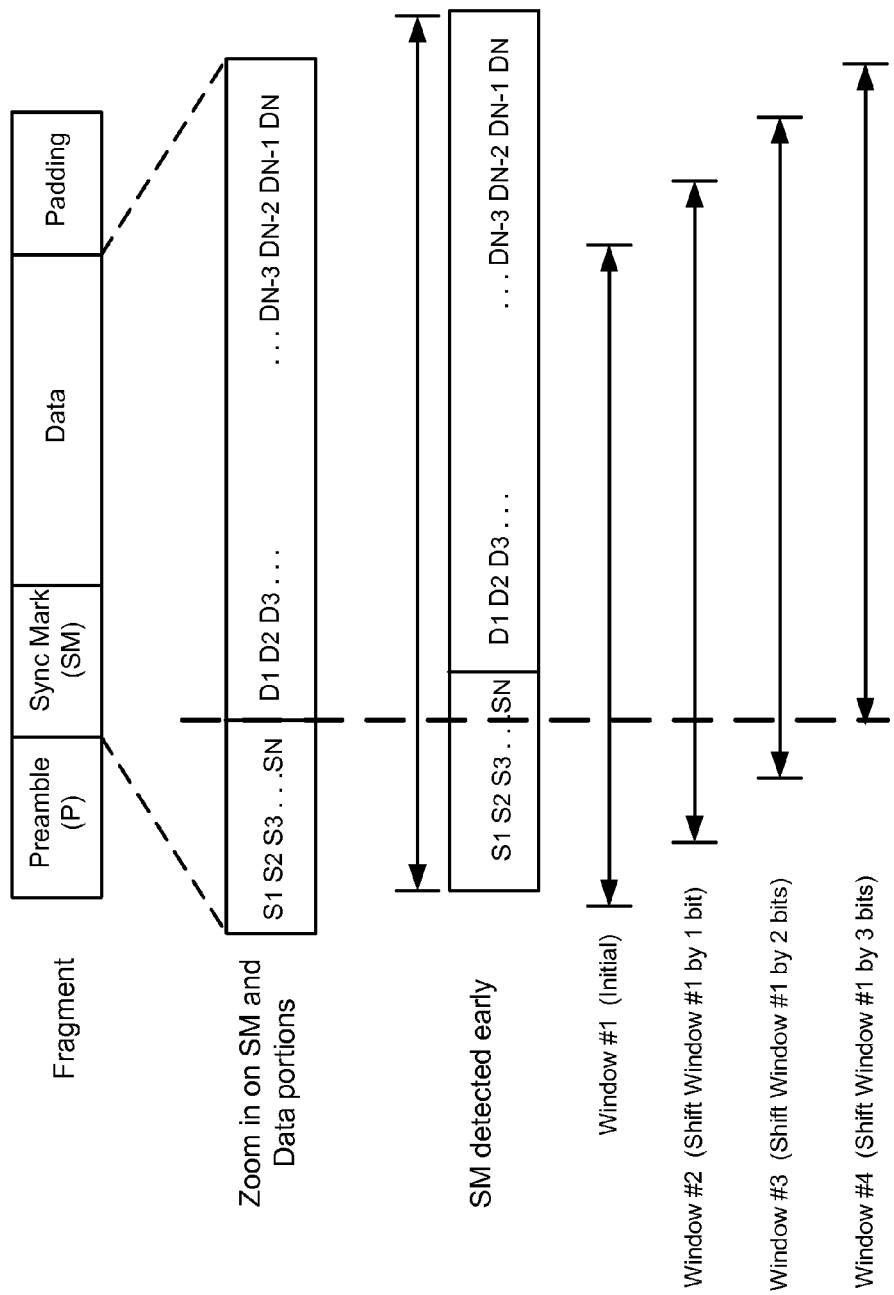
FIG. 12 shows an example of performing a recovery procedure of a sync mark search via applying a window on the data received.

FIG. 12 shows an example of performing a recovery procedure of a sync mark search via applying a window on the data received. In some embodiments, the sync mark search technique of recovery of this example can be used in system 200 (e.g., at recovery block 204). In some embodiments, whether the sync mark search technique of recovery of this example is implemented at system 200 is configured by a user via parameters associated with system 200 or a controller thereof. In some embodiments, the sync mark search technique of recovery can be performed in line with an ITI removal procedure in an on-the-fly operation. In some embodiments, the sync mark search technique of recovery can be performed in an offline operation. In some embodiments, the sync mark search technique of recovery can be applied when a defect occurs at the sync mark and the sync mark is not detected correctly. In some embodiments, system 200 can be configured via one or more associated parameters to perform any combination of ITI removal and/or recovery processes (e.g., whether a recovery process is to be used and if so, which technique; whether an ITI removal procedure is to be used and if so, in response to which event).

In the example, given that the fragment is detected incorrectly (in this example, the fragment is detected early), the system (such as system 200) or a controller thereof sweeps a data window one bit at a time (e.g., per each global iteration of SOVA detecting/decoding) until the data is successfully decoded (e.g., the LDPC decoder outputs a "correctable" data status). In various embodiments, the data does not need to be re-read from ADC memory (or wherever it is stored) in between shifting windows. In the example, initially, Window #1 is applied on the data before it is fed to the (e.g., SOVA) detecting/decoding process. If the LDPC decoder returns an "uncorrectable" data status (e.g., after a certain number of global iterations as configured by a user), then the window is shifted by one bit to form Window #2 and SOVA detecting/decoding is attempted again. If the LDPC decoder returns an "uncorrectable" data status (e.g., after a certain number of global iterations as configured by a user), then the window is shifted by one bit to form Window #3 and the process repeats until the window is applied along the correct location of the fragment such that the data could be successfully decoded. In this example, the window that correctly detects the SM location is Window #4.

In various embodiments, with the presence of ITI, the windowing technique alone may not be sufficient to enable the data to be successfully decoded. For example, the SNR of the data sector read may be low due to the ITI from adjacent tracks and so the LDPC decoder status may be returned as "uncorrectable" data even if the data window is applied such the SM of the data is aligned to the proper SM location. As such, the sync mark search windowing technique of this example may be combined with ITI cancellation at system 200, where a sync mark search can be applied to an input sequence at recovery block 204 and the recovery sequence B is ITI cancelled before entering the SOVA/LDPC detecting/decoding process. For example, to account for the shifting windows of the sync mark search technique, the Cm would just need to be shifted in time for the number bits that are shifted as a result of the sync mark search technique. Therefore, the sync mark search can be performed in line with the ITI correlation and cancellation processes.

Figure 13:
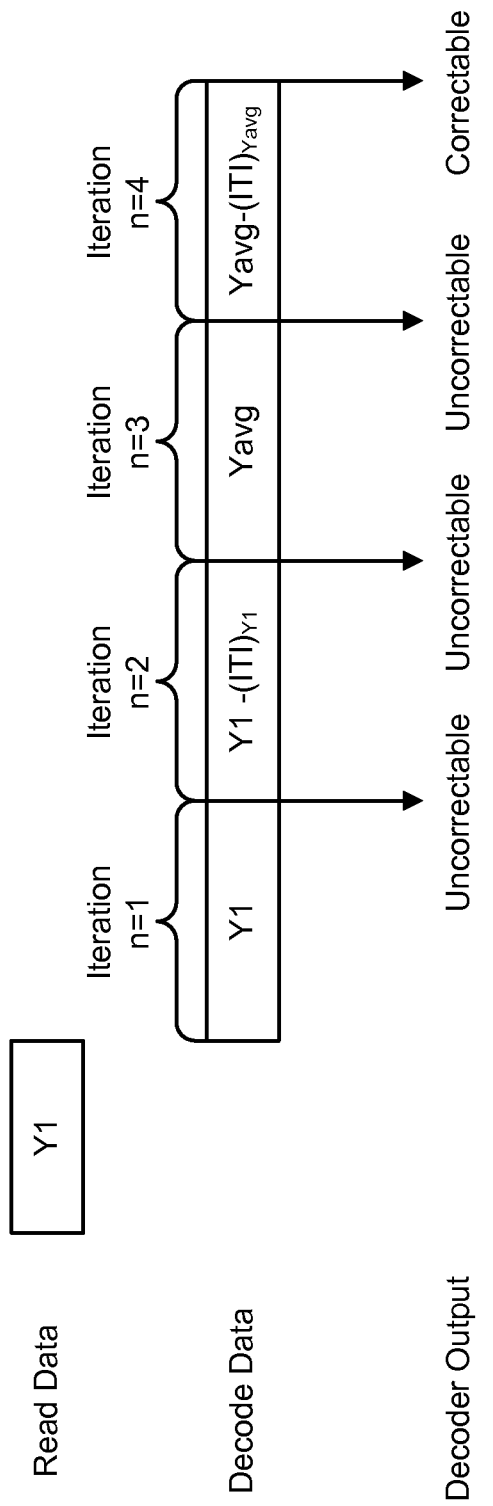
FIG. 13 shows an example of a schedule of performing a recovery procedure of averaging data.

FIG. 13 shows an example of a schedule of performing a recovery procedure of averaging data. In some embodiments, the sync mark search technique of recovery of this example can be used in system 200 (e.g., at recovery block 204). In some embodiments, whether the sync mark search technique of recovery of this example is implemented at system 200 is configured by a user via parameters associated with system 200 or a controller thereof. In some embodiments, the averaging data technique of recovery can be performed in line with an ITI removal procedure in an on-the-fly operation. In some embodiments, the averaging data technique of recovery can be performed in an offline operation. In some embodiments, averaging data can be performed when defects occur at the data region of a fragment. In some embodiments, system 200 can be configured via one or more associated parameters to perform any combination of ITI removal and/or recovery processes (e.g., whether a recovery process is to be used and if so, which technique; whether an ITI removal procedure is to be used and if so, in response to which event).

In the averaging data recovery procedure, one or more data sectors are read multiple times and an averaging function is applied to the samples received from multiple reads to increase the probability of successfully decoding data. For example, a system (such as system 200) or a controller thereof will attempt to decode a combination of data associated with one or more data sectors and that could be ITI cancelled. Examples of combinations of data could include: data associated with the data sector just read, ITI cancelled data associated with the data sector just read, averaged data associated with the data sector just read and one or more data sectors that were previously read, and ITI cancelled averaged data associated with the data sector just read and data sectors that were previously read. In some embodiments, data associated with the data sector just read and those previously read are stored in the ADC memory (or another form of memory or storage) such that the data sectors do not need to be re-read for the performance of this technique.

As shown in the example of FIG. 13, Y1 represents the data sector that was just read (e.g., by system 200). The system attempts to process Y1 through at least one iteration of (e.g., SOVA) detecting/decoding but the decoder still determines that the data is "uncorrectable." Next, the system attempts to process Y1–$(ITI)_{Y1}$ (ITI cancelled data associated with the data sector just read) through at least one iteration of detecting/decoding but the decoder still determines that the data is "uncorrectable." Then, the system attempts to process Yavg (averaged data associated with the data sector just read and data sectors that were previously read) through at least one iteration of detecting/decoding but the decoder still determines that the data is "uncorrectable." Lastly, in this example, the system attempts to process Yavg–$(ITI)_{Yavg}$ (ITI cancelled averaged data associated with the data sector just read and data sectors that were previously read) through at least one iteration of detecting/decoding and the decoder determines that the data is "correctable." In some embodiments, as many combinations of data is attempted to be decoded as possible within one revolution. While the ordering of decoding data in this example is Y1, Y1–$(ITI)_{Y1}$, Yavg, and Yavg–$(ITI)_{Yavg}$, the decoding ordering could be arranged in other ways (and to include other combinations of data) to minimize recovery decoding time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing data, comprising:
   receiving an input sequence of samples;
   receiving an indication associated with a user configured event configured to cause Inter-Track-Interference (ITI) cancellation;
   in response to receipt of the indication, processing the input sequence in at least a detector over a first iteration while simultaneously processing the input sequence to produce correlation information over at least a portion of the first iteration;
   generating ITI information based at least in part on the correlation information; and
   using the ITI information and the input sequence to generate an ITI information cancelled input sequence prior to processing the input sequence in at least the detector over a second iteration, wherein the second iteration is subsequent to the first iteration.

2. The method of claim 1, wherein the detector comprises a soft output Viterbi algorithm (SOVA) detector.

3. The method of claim 1, wherein the correlation information comprises one or more correlation coefficients.

4. The method of claim 3, further comprising selecting a subset of the one or more correlation coefficients based on the subset of the one or more correlation coefficients meeting a condition.

5. The method of claim 4, wherein the condition is one or more of the following: meeting a preset threshold, being among correlation coefficients associated with the highest energies, and being within a preset range.

6. The method of claim 1, wherein the ITI information is generated using at least the correlation information and known data associated with at least one track adjacent to a track associated with the input sequence.

7. The method of claim 1, wherein processing the input sequence in at least the detector over one iteration includes processing an output by the detector based at least in part on the input sequence, in a decoder.

8. The method of claim 7, wherein the decoder comprises a low density parity check (LDPC) decoder.

9. The method of claim 1, wherein the ITI information includes ITI samples.

10. The method of claim 1, wherein the correlation information is computed using at least the input sequence and known data associated with at least one track adjacent to a track associated with the input sequence.

11. The method of claim 1, wherein the input sequence is associated with a track associated with a hard drive.

12. The method of claim 1, further comprising storing the ITI information at a storage or memory associated with storage of the input sequence.

13. The method of claim 1, wherein using the ITI information and the input sequence to generate the ITI information cancelled input sequence comprises cancelling at least a portion of the ITI information from the input sequence to generate the ITI information cancelled input sequence.

14. The method of claim 1, further comprising processing the ITI information cancelled input sequence in at least the detector over the second iteration.

15. The method of claim 1, further comprising storing the ITI information cancelled input sequence.

16. The method of claim 1, wherein the indication is associated with a preset iteration associated with processing the input sequence in at least the detector.

17. The method of claim 1, wherein the indication is associated with a type of feedback associated with processing the input sequence in at least the detector.

18. The method of claim 17, wherein the type of feedback includes one or more of the following: LDPC feedback, LLR, intermediary feedback, SOVA detector feedback, a number of parity check equations that are violated, and extrinsic information from an LDPC decoder.

19. The method of claim 1, further comprising performing one or more recovery processes on the input sequence.

20. The method of claim 19, wherein performing one or more recovery processes on the input sequence comprises performing the one or more recovery processes on the input sequence prior to processing the input sequence in at least the detector over one or more iterations.

21. The method of claim 19, wherein the one or more recovery processes includes applying a window over at least a portion of the input sequence and using the portion of the input sequence included within the window for processing the input sequence in at least the detector over one or more iterations.

22. The method of claim 21, further comprising receiving an indication associated with uncorrectable data and shifting the window by at least one bit over at least a portion of the input sequence.

23. The method of claim 19, wherein the one or more recovery processes includes the input sequence comprising a first input sequence associated with a first data sector and wherein a second input sequence is associated with a second data sector, averaging the first and second input sequences to produce an average input sequence, and using the average input sequence for processing the input sequence in at least the detector over one or more iterations.

24. The method of claim 23, wherein processing the input sequence in at least the detector over the first iteration comprises processing the average input sequence.

25. The method of claim 24, further comprising cancelling at least a portion of the ITI information from the average input sequence.

26. The method of claim 25, further comprising processing the ITI information cancelled average input sequence in at least the detector over one or more iterations.

27. The method of claim 1, wherein a power consumption associated with processing the input sequence in at least the detector over one iteration is greater than a power consumption associated with processing the input sequence to produce ITI information during at least a portion of the iteration.

28. A system for processing data, comprising:
an interface configured to receive an indication associated with a user configured event configured to cause Inter-Track-Interference (ITI) cancellation;
a detector configured to receive an input sequence of samples and process the input sequence over a first iteration; and
an ITI correlator configured to:
in response to receipt of the indication, simultaneously process the input sequence to produce correlation information over at least a portion of the first iteration;
generate ITI information based at least in part on the correlation information; and
use the ITI information and the input sequence to generate an ITI information cancelled input sequence prior to processing the input sequence in at least the detector over a second iteration, wherein the second iteration is subsequent to the first iteration.

29. The system of claim 28, wherein the correlation information is based at least in part on one or more correlation coefficients.

30. The system of claim 28, wherein the ITI information is generated using at least the correlation information and known data associated with at least one track adjacent to a track associated with the input sequence.

31. The system of claim 28, wherein the ITI information includes ITI samples.

32. The system of claim 28, wherein the correlation information is computed using at least the input sequence and known data associated with at least one track adjacent to a track associated with the input sequence.

33. The system of claim 28, wherein using the ITI information and the input sequence to generate the ITI information cancelled input sequence comprises cancelling at least a portion of the ITI information from the input sequence to generate the ITI information cancelled input sequence.

34. The system of claim 28, further comprising processing the ITI information cancelled input sequence in at least the detector over the second iteration.

35. The system of claim 28, further comprising storing the ITI information cancelled input sequence.

36. The system of claim 28, wherein the indication is associated with a preset iteration associated with processing the input sequence in at least the detector.

37. The system of claim 28, wherein the indication is associated with a type of feedback associated with processing the input sequence in at least the detector.

38. The system of claim 28, further comprising a processor configured to perform one or more recovery processes on the input sequence.

39. The system of claim 38, wherein the one or more recovery processes are performed on the input sequence prior to the detector processing the input sequence over one or more iterations.

40. A computer program product for processing data, the computer program product being embodied in a non-transitory computer readable medium and comprising computer instructions for:
receiving an input sequence of samples;
receiving an indication associated with a user configured event configured to cause Inter-Track-Interference (ITI) cancellation;
in response to receipt of the indication, processing the input sequence in at least a detector over a first iteration while simultaneously processing the input sequence to produce correlation information over at least a portion of the first iteration;
generating ITI information based at least in part on the correlation information; and
using the ITI information and the sequence to generate an ITI information cancelled input sequence prior to processing the input sequence in at least the detector over a second iteration, wherein the second iteration is subsequent to the first iteration.

* * * * *

UNITED STATES PATENT AND TRADEMARK OFFICE
CERTIFICATE OF CORRECTION

| | | |
|---|---|---|
| PATENT NO. | : 8,862,971 B1 | Page 1 of 1 |
| APPLICATION NO. | : 13/166717 | |
| DATED | : October 14, 2014 | |
| INVENTOR(S) | : Chan et al. | |

It is certified that error appears in the above-identified patent and that said Letters Patent is hereby corrected as shown below:

Claims

In column 18, Line 31, Claim 13, before "sequence", delete "input".

In column 19, Line 36, Claim 28, before "sequence", delete "input".

In column 20, Line 6, Claim 33, before "sequence", delete "input".

Signed and Sealed this
Sixteenth Day of February, 2016

Michelle K. Lee
*Director of the United States Patent and Trademark Office*